June 12, 1956      E. H. KENDALL      2,749,805

SADDLE TRAVERSING MECHANISM FOR GEAR SHAPERS AND THE LIKE

Filed Jan. 21, 1955      4 Sheets-Sheet 1

INVENTOR.
EDWARD H. KENDALL
BY John Morton
HIS ATTORNEY

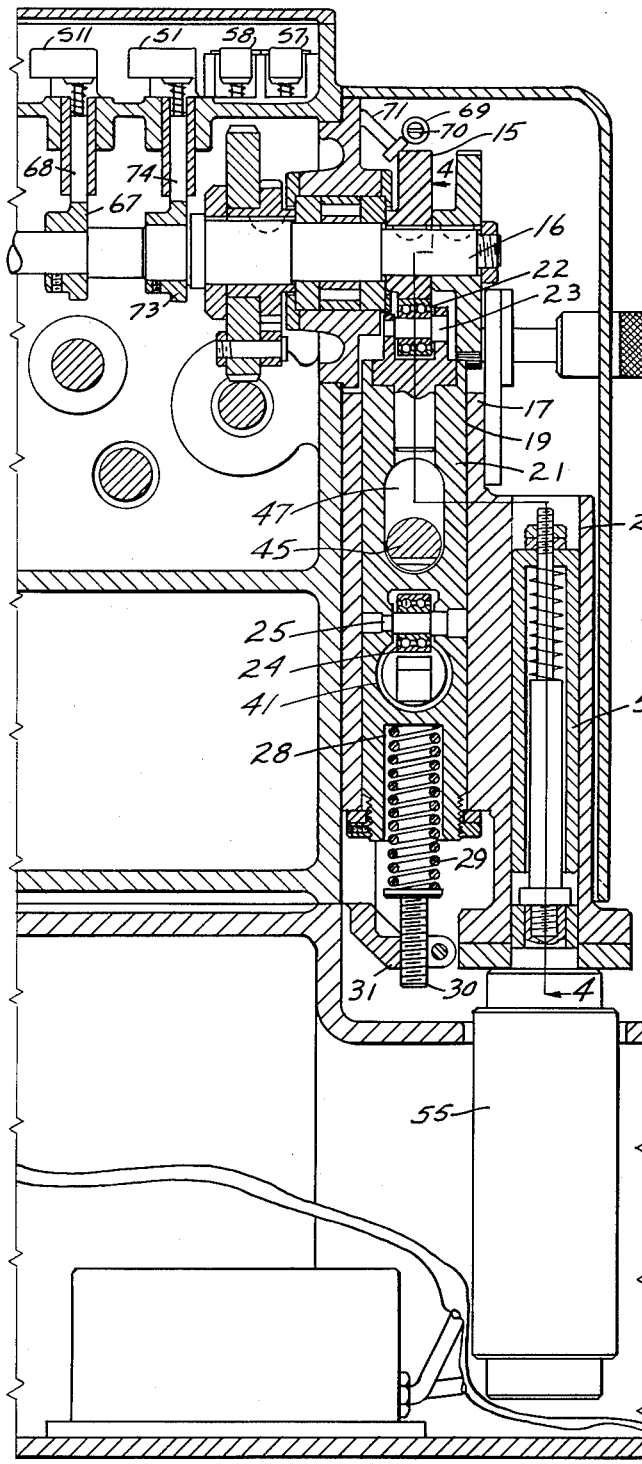
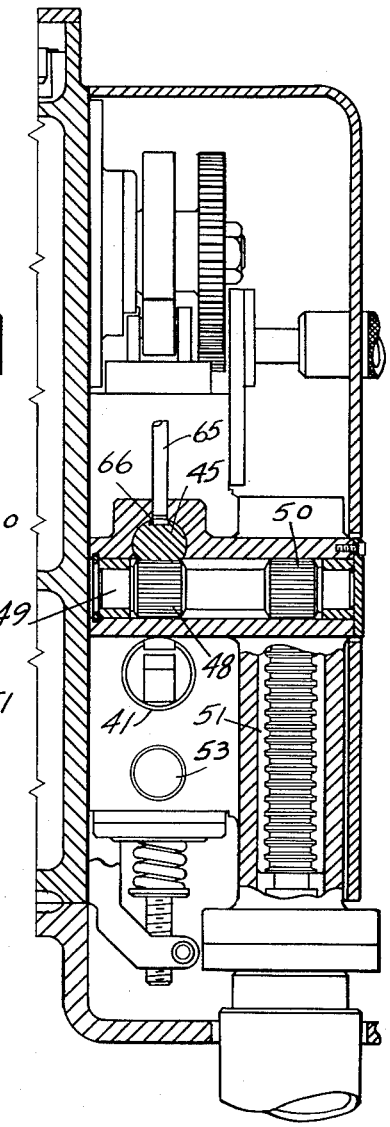
FIG. 2.
FIG. 3.
INVENTOR.
EDWARD H. KENDALL
BY
John Morton
HIS ATTORNEY

INVENTOR.
EDWARD H. KENDALL

June 12, 1956 E. H. KENDALL 2,749,805
SADDLE TRAVERSING MECHANISM FOR GEAR SHAPERS AND THE LIKE
Filed Jan. 21, 1955 4 Sheets-Sheet 4

INVENTOR.
EDWARD H KENDALL
BY John Morton
HIS ATTORNEY

United States Patent Office 2,749,805
Patented June 12, 1956

2,749,805

SADDLE TRAVERSING MECHANISM FOR GEAR SHAPERS AND THE LIKE

Edward H. Kendall, North Springfield, Vt., assignor to The Fellows Gear Shaper Company, Springfield, Vt., a corporation of Vermont Application January 21, 1955, Serial No. 483,393

10 Claims. (Cl. 90—7)

This invention relates to machines for forming teeth and other analogous forms on a work piece of the type of the well-known Fellows gear shaper. Such machines employ a cutter having teeth arranged circumferentially similar to a gear element or other analogous shape and with cutting edges on one end thereof. The cutter is mounted on a cutter spindle which is given a motion of reciprocation and rotation relative to a work piece mounted on a work spindle adjacent to the cutter spindle. The work spindle is rotated relatively to the cutter spindle during its reciprocation. During the reciprocation and rotation of the cutter spindle it is gradually fed transversely into depth relative to the work piece on the work spindle and after it has reached the desired depth of cut it is held in a relatively transversely fixed position until the complete gear or other toothed shape has been generated on the work piece. After the gear has been completed the cutter spindle is retracted from its cutting position to permit removal of the work piece from the work spindle.

The primary object of the present invention is to provide an improved mechanism for feeding the cutter spindle and cutter into depth relative to the work spindle and work piece mounted thereon.

A second object is to provide a means which will permit retraction of the cutter spindle from the work spindle through a greater degree than hitherto possible without disturbing the setting of the work spindle relative to the cutter saddle in which the cutter spindle is mounted.

A third object of the present invention is to provide a means which will permit the feeding into depth of the cutter spindle relative to the work spindle and at the same time will not reflect any eccentricity which might be inherent in the customary depth feed cam which would in turn be imparted to the cutter spindle so as to produce an improperly shaped gear.

Still another object is to provide a means which will make it possible to make fine adjustments of the cutter spindle relative to the work spindle without disturbing the depth feed mechanism and its related cam.

The illustrative machine referred to in the present application is similar to that shown in the patent of Edward W. Miller No. 2,034,765 and that referred to in the patent of Edwin R. Fellows No. 1,478,472. It is understood, however, that the protection claimed herein is not to be limited exclusively to combinations or uses with machines of that type.

In the drawings:

Figure 2 is a section taken on the line 2—2 of Figure 1;

Figure 3 is a view on the line 3—3 of Figure 1;

Like reference numerals designate the same elements wherever they appear in all the figures.

Figure 1:
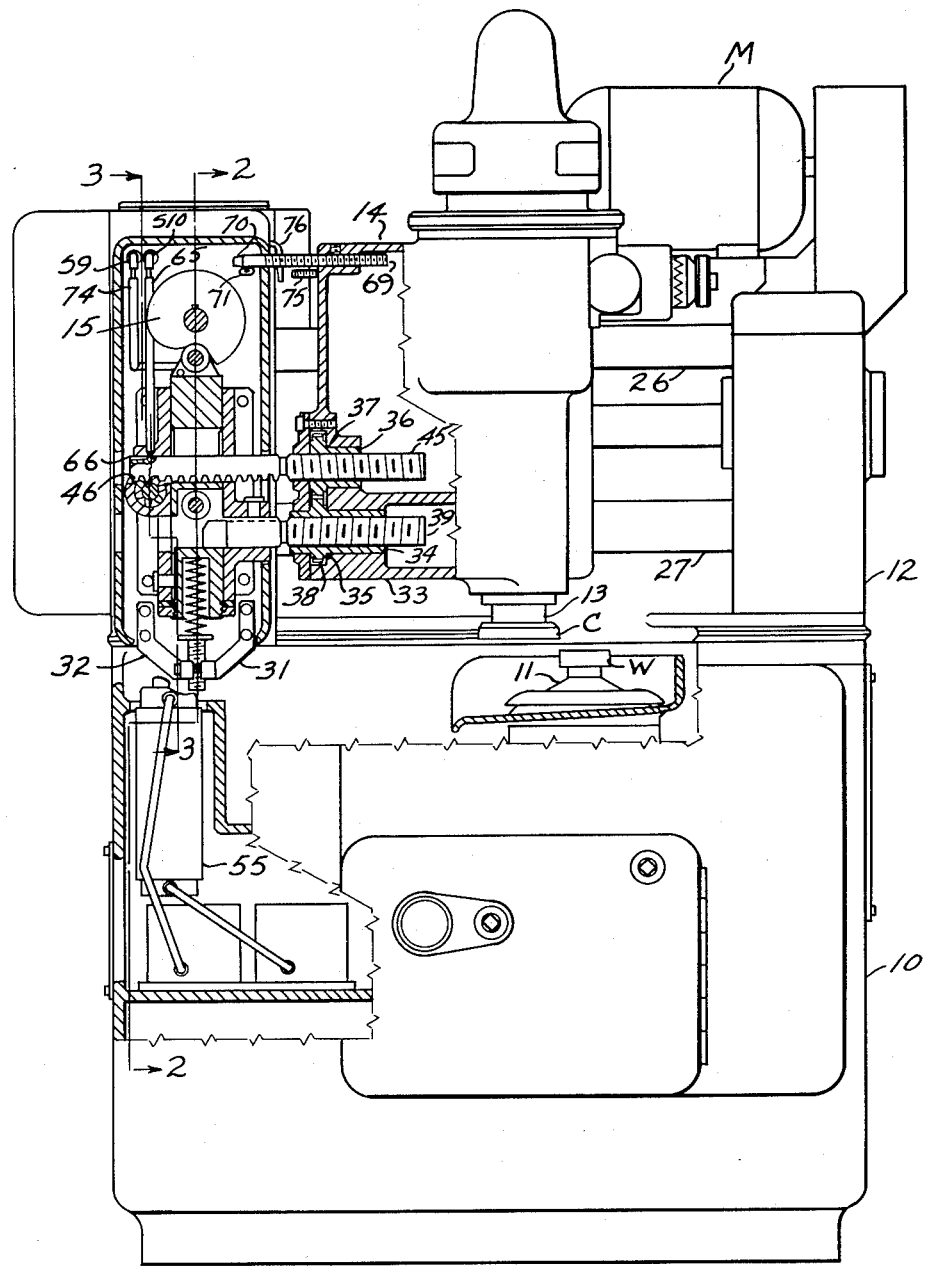
Figure 1 is a front elevation of the machine with the depth feed mechanism shown in section.

As shown in Fig. 1 a base member 10 supports a work spindle 11 thereon rotatably in the customary gear shaper manner. This work spindle 11 is adapted to support a work piece W. Supported and secured to the top of the base member 10 is bed 12. This bed 12 carries a cutter saddle 14 thereon as described below and in the cutter saddle 14 is mounted the cutter spindle 13.

As is well known in the art the bed member 12 carries a main drive motor M which through the usual suitable gearing drives the cutter spindle 13 and the work spindle 11. This gearing (not shown) as is well known in the art is constructed and arranged so as to impart the desired timed rotation to the cutter and work spindle so as to give the desired generated shape to the work piece. This main motor M is also arranged in the customary manner to reciprocate the cutter spindle 13 in time with the rotation of the cutter spindle and the work spindle 11. As shown in the present embodiment on the lower end of the cutter spindle 13 is mounted a cutter C. As is well known in the art as the cutter spindle 13 rotates and reciprocates the work spindle 11 also rotates in timed relation to the rotation of the cutter spindle, and the cutter C will generate teeth conjugate to the teeth of the cutter on the work piece W. In the present disclosure the cutter saddle is fed toward the work to obtain the desired depth feed although the position of cutter and work may be reversed.

The cutter saddle 14 is mounted on guide ways 26 and 27 for sliding movement. As the cutter saddle is fed to the right as viewed in Fig. 1 it will bring the cutter C into engagement with the work W and will gradually be fed along the guide ways 26 and 27 so as to feed the cutter C into depth to produce the desired shape of teeth on the work W. After the teeth are formed in the work as desired it is necessary to withdraw the cutter spindle from the work, and this is done by causing it to move to the left as viewed in Fig. 1. The invention in the present application is concerned with the mechanism for moving the saddle 14 in both directions on the ways 26 and 27.

Rotatably mounted in the bed 12 is a depth feed cam 15. As shown on an enlarged scale in Fig. 2 this depth feed cam 15 is fixed to rotate on a shaft 16. Shaft 16 corresponds to the shaft 130 as shown in Miller Patent No. 2,034,765. Likewise, the depth feed cam 15 corresponds to the depth feed 105 of said patent. As is shown in said patent and as is well known in the art this depth feed cam is rotated in timed relation to the rotation of both the cutter spindle and the work spindle. The drive to the shaft 16 is not shown since it is not a part of the present invention. However, a drive such as shown in the Miller patent referred to above can be used to drive the shaft 16 so that the depth feed cam 15 will rotate in the proper timed relation to the rotation of the work spindle and the rotation and reciprocation of the cutter spindle.

A bracket member 17 is mounted on the bed member 12 and held thereon by bolts 18. The bracket member 17 carries two slide ways therein 19 and 20 (see Figures 2 and 4). In the slide way 19 is slideably mounted a slide member 21 which on its upper end carries a roller bearing 22 which serves as a follower for depth feed cam 15. This roller bearing is rotatably mounted on the stud 23 which is fixed in the slide member 21. A roller bearing 24 which is similar to the roller bearing 22 is mounted in the lower end of the slide member 21 by means of a stud 25 for movement with the slide. This bearing member 24 functions in a manner later set forth to cooperate directly with the saddle member 14 to cause feeding movement of the cutter into the work.

Formed in the slide member 21 on its lower end as viewed in Figures 1 and 2 is an opening 28. This opening 28 serves as a seat for the spring 29. The lower end of the spring 29 abuts an adjusting screw 30. This adjusting screw is rotatably and threadedly mounted in arms 31 and 32 which are fixed to the bed member 12. In order to adjust the tension of the spring 29 the screw member 30 may be rotated to either increase or decrease the urging force exerted by the spring 29. As will be readily apparent the spring 29 tends to urge the slide member 21 upwardly carrying with it the follower bearing 22 and thereby urges the follower 22 into engagement with the depth feed cam 15. As viewed in Figures 1 and 4 the depth feed cam 15 is driven to rotate in a counter-clockwise direction when the cutter C is being fed into depth with relation to the work piece W.

As seen in Figure 1 there is mounted in the extension 33 of the saddle 14 a nut member 34. This nut member 34 is held against longitudinal movement in the extension 33 by a shoulder portion 35 which cooperates with the extension 33 as will be readily apparent. A second nut 36 is also mounted in the extension 33 and held against any longitudinal movement therein by a shoulder 37 which is similar to shoulder 35. These shoulders 35 and 37 have gear teeth 38 formed on their circumference. These gear teeth 38 are conjugate on each nut and intermesh with each other. A means is provided (not shown) to manually rotate one of the nuts from the exterior of the machine. As will be obvious, due to the intermeshing relationship of the gear teeth 38 on the shoulders of both nuts when one nut is rotated the other will be similarly rotated. The nut members 34 and 36 have threads of opposite hand therein for a purpose to be later described.

Figure 4:
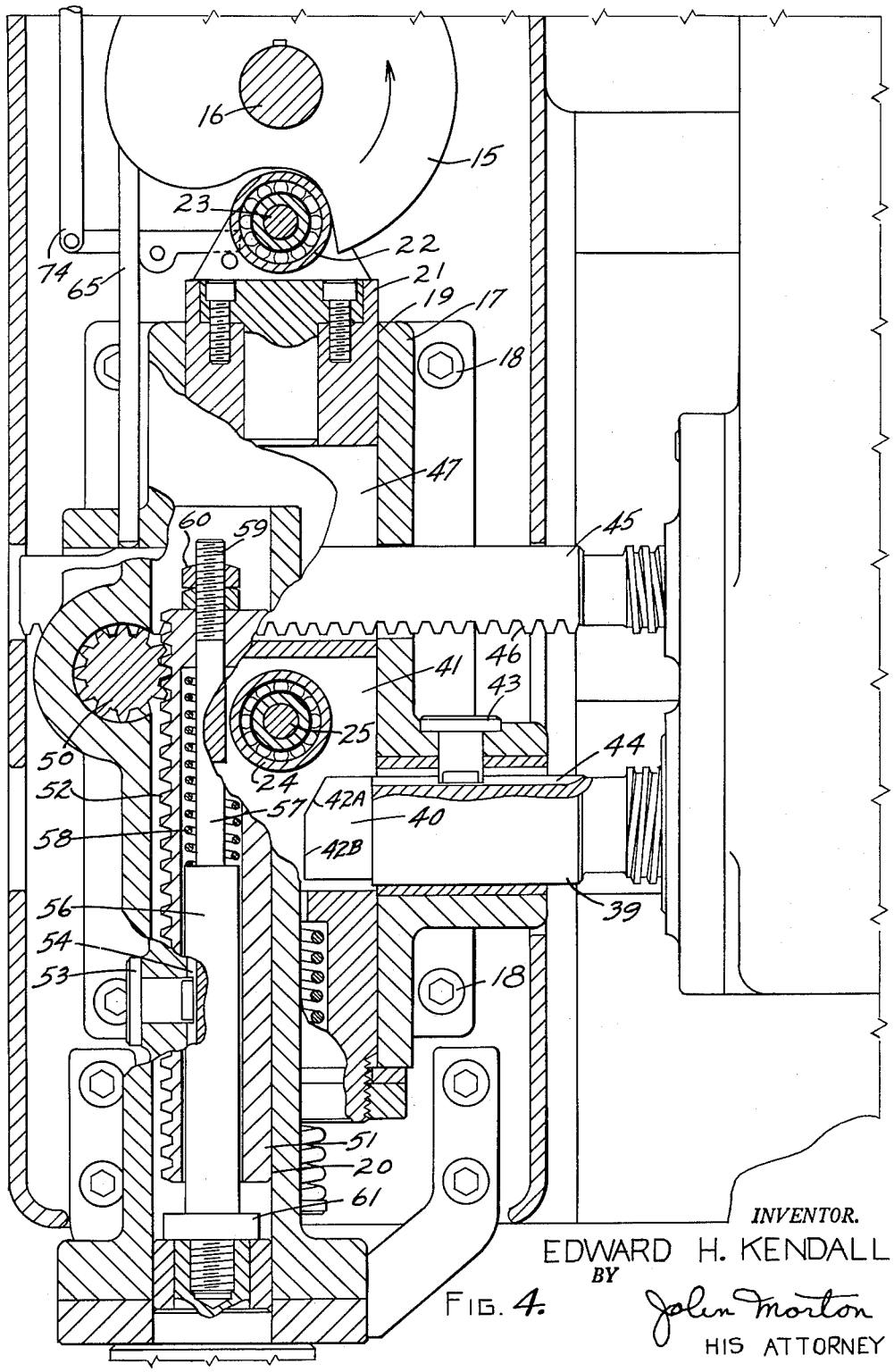
Figure 4 is a fragmentary vertical section of the depth feed mechanism on an enlarged scale showing the operative main elements of the depth feed mechanism of the present invention.

Threaded into the nut member 34 is a bar like cam member 39. This cam member 39 has an extension 40 thereon. This extension 40 extends through the bracket 17 into an opening 41 in the slide member 21. As seen in Figures 1 and 4 the extension 40 has a cam surface 42 formed on the end thereof. This cam surface consists of an angularly disposed portion 42A and a vertical portion 42B. The vertical portion 42B is disposed parallel to the axis of the cutter spindle 13 for a reason to be later described. The member 39 is held against rotation in the saddle and in the bracket 17 by means of a pin 43 which extends through the bracket into a key way 44 in the cam member 39.

Threaded into the second nut member 36 is a threaded toothed member 45. As heretofore stated the threads on the member 45 are of an opposite hand to the threads on the member 39. The member 45 on the end opposed to the threaded end has rack teeth 46 formed thereon. The portion having the rack teeth 46 thereon extends through an opening 47 in the slide member 21 (see Figures 1 and 2). The teeth 46 are in engagement with the conjugate teeth formed on a pinion 48. This pinion 48 is formed integral with the shaft 49 which is journaled in the bracket member 17 as seen in Figure 3. Also formed integral with the shaft 49 is a pinion 50.

Mounted to slide in the slide way 20 is a second slide 51. This slide 51 has rack teeth 52 formed thereon, which teeth mesh with conjugate teeth formed on pinion 50.

The slide member 21 is held against rotation in the slide 19 by means of a pin 53 fixed in the bracket 17. This pin 53 extends into a keyway 54 formed in the slide 21. The slide 51 is actuated from a piston located in the cylinder 55. This cylinder 55 may be either pneumatic or hydraulic or any other suitable actuating means. The piston in the cylinder 55 has a piston rod 56 extending into the slide 51.

Piston rod 56 is connected to the slide 51 by means of a lost motion connection constructed in the manner shown in Figures 2 and 4. The upper end 57 of the piston rod 56 is of reduced diameter. This upper end has a spring 58 encircling it within the slide 51. The upper end 57 extends through the top of the slide 51 and has a threaded end 59 thereon which is engaged by nuts 60 to hold the slide 51 on the piston rod 56. On the lower end of the piston rod 56 there is formed a shoulder 61 which serves the purposes of a stop member.

From the construction described above it will be apparent that the slide member 51 is capable of limited movement without affecting in any way the piston rod or the piston located in cylinder 55. Likewise, the piston rod may be actuated to a limited degree without moving the slide 51.

When the piston rod 56 moves upwardly under pressure exerted in the cylinder 55 it moves freely until the stop collar 61 engages the bottom of the slide 56. When the stop 61 engages the slide 51 it will be seen that due to the rack teeth 52 meshing with teeth on the pinion 50, the pinion 50 will be rotated in a counter-clockwise direction. Similarly, since the pinion 48 is formed integrally with the pinion 50, the pinion 48 will be rotated in a counter-clockwise direction. When the pinion 48 is so rotated, due to the fact that it has teeth meshing with the rack teeth 46 formed on the member 45, it will tend to draw the saddle 14 to the left as viewed in Figure 1. Also, as will be apparent, when the piston rod moves downwardly there will be a limited amount of movement until the nut 60 engages the top of the slide member 51. Solenoid switches S1, S7, S8 and S11 are provided to operate the depth feed mechanism described above in the proper sequence.

The sequence of operations of the device as described above is as set forth in the following paragraphs.

When a work piece has been placed on the work spindle 11 the usual start button is depressed, and upon actuation of the start button the saddle 14 is moved to the right as seen in Figure 1 under pressure exerted by the piston rod 56 moving downwardly. When the nuts 60 engage the top of the slide 51 the pinion 50 is rotated clockwise and carries with it the pinion 48, the teeth of which engage the rack teeth 46 and thereby the member 45 is moved to the right forcing with it the saddle 14. When the saddle 14 reaches the desired position the stroking of the cutter spindle 13 is started by a limit switch operated by the movement of the saddle. The movement of the saddle under pressure exerted by piston rod 51 is stopped by the piston carrying the piston rod 56 reaching the end of its stroke.

When the stroking of the cutter spindle 13 is started the depth feed cam 15 is rotated as is usual in the customary gear shaper. At the beginning of the operation of the depth feed cam 15 will be in the position shown in Figure 4. Upon continued operation of the depth feed cam in a counter-clockwise direction it will be apparent that the rise on the cam will engage the follower member 22 and the slide 21 will be forced downwardly. Upon moving downwardly the slide 21 which carries the bearing member 24 will force the bearing member 24 into engagement with the angularly disposed portion 42A of the cam surface 42. As the bearing member 24 engages the cam surface 42A it will be apparent that the bar like cam member 39 will be forced to the right as viewed in Figure 1 and accordingly, since it is fixed in the nut member 34 which is in turn in the saddle 14, will force the saddle 14 to the right carrying with it the cutter spindle 13. The cutter C will be fed into full depth while the bearing member 24 is engaging the angularly disposed portion 42A of the cam surface 42.

After the cutter C is fed into full depth the bearing member 24 will engage the vertical section 42B of the cam surface 42. This vertical portion of the cam surface 42 is parallel to the axis of the vertical slide 21 and the axis of the cutter spindle 13. At this time when the bearing member 24 is engaging the vertical portion 42B of the cam surface 42 the depth feed cam 15 has reached the position where the concentric portion of the cam is in contact with the follower member 22. It will be readily apparent that if any eccentricity exists in the depth feed cam 15 or in the follower 22 it will not be transferred to the work due to the relation of the vertical surface on the cam member 39 and the axis of the vertical slide 21.

After the depth feed cam 15 has rotated sufficiently so that the bearing member 24 has engaged the cam surface 42 the air to the cylinder 55 is reversed by one of the solenoid operated valves mentioned above which gets a signal from the shaft on which the depth feed cam 15 is mounted. Upon the reversal of air to the cylinder 55 the piston rod 56 is moved upwardly until the stop shoulder 61 engages the slide 51. When this occurs due to the intermeshing engagement of teeth 58 on slide 51 with the teeth on pinion 50, the pinion 50 will tend to be rotated in a counter-clockwise direction carrying with it the pinion 48 which meshes with teeth 46 of the member 45. Due to the counter-clockwise urging of pinion 48 the member 45 will be urged to the left as viewed in Figure 1 and due to the fixed connection of member 45 with the saddle 14 the saddle 14 will likewise be urged to the left, and therefore the cam member 39 will likewise be urged leftwardly and the cam surface 42 will be held firmly in engagement with the bearing member 24.

At the end of the cutting cycle the vertical slide 21 will be forced upwardly under the pressure exerted by the spring 29. The depression in the depth feed cam 15 will then be in the position shown in Figure 4. Due to the engagement of the stop 61 with the bottom of the slide 51 the air acting in the cylinder 55 will then be free to move the piston rod 56 upwardly carrying with it the pinion 50 rotating in a counter-clockwise direction, which through the connections hitherto described will move the saddle 14 to the left carrying the cutter out of engagement with the work piece W mounted on the work spindle 11. When the follower member 22 reaches substantially the bottom portion of the depression in the depth feed cam 15 the air to the cylinder 55 is shut off through a solenoid controlled valve which gets an impulse through mechanism mounted on the shaft on which is mounted the depth feed cam 15. When the saddle 14 has been moved to the left the work piece W may be removed from the work spindle 11.

If the design of the work piece is such that it cannot readily be removed from the work spindle 11 without further withdrawal of the cutter saddle 14 the depth feed mechanism of the present invention is so arranged that the saddle 14 is capable of a substantial movement toward the left as viewed in Figure 1 without disturbance of the saddle setting.

In order to permit this added movement of the cutter saddle 14 the depression in depth feed cam 15 is made sufficiently deep so that the bar like cam member 39 may pass to the left beneath the bearing member 24 as viewed in Figures 1 and 4. The passage of the cam member 39 beneath the bearing member 24 permits free movement of the saddle 14 away from the work spindle 11 by means of the application of air to the cylinder 55, and it is not necessary to loosen any clamping nuts on the saddle 14 or any other element of the machine.

As is well known in the art it is possible to provide for multiple cuts on the work piece by providing a different depth feed cam 15. Such multiple cuts may be obtained by having a two cut cam or any desired number of cuts on the cam which will have a similar number of concentric surfaces formed on its outer circumference. It is then necessary to provide the necessary change gears in the machine drive which will permit rotation of the work once for each concentric portion formed on the depth feed cam 15.

Figure 5:
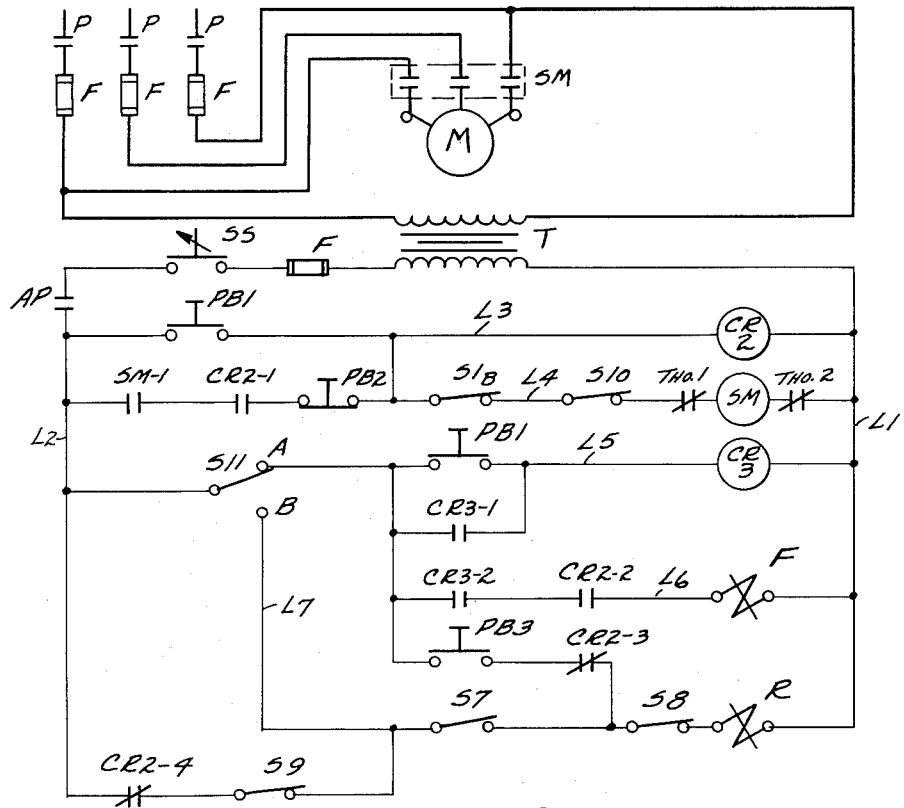
Figure 5 is a typical illustrative electrical wiring diagram which may be used to actuate the elements of the present depth feed mechanism.
Figure 6:
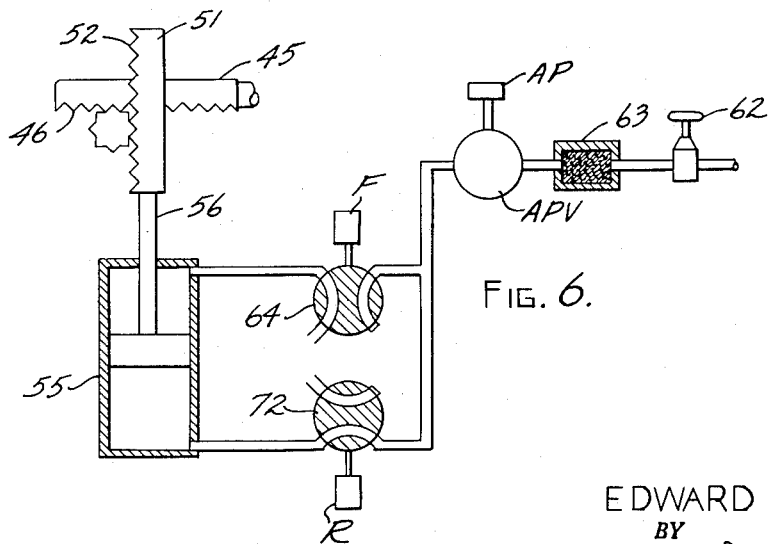
Figure 6 is a pneumatic diagram which can be employed to actuate the mechanism of the present invention in conjunction with the electrical connection shown in Figure 5.

Electrical controls may be used to properly time the movements of the various elements of the present invention and they may be of the character shown in Figures 5 and 6 which operate in the manner described below.

When the machine is stopped a new work blank is mounted on work spindle 11. The depth feed follower roller 22 is in the low point of the depth feed cam 15 and the saddle 14 is backed off to its left position.

The power selector switch SS is then turned on, thus making the contact for the main lines L1 and L2. Then air hand valve 62 (Fig. 6) is turned on manually. When air has reached the required pressure, pressure switch AP closes. AP is an air pressure switch which when energized makes the necessary contact for starter button PB1. Numeral 63 (Fig. 6) designates an air filter which merely cleans the air before it passes through the air lines and cylinder of the present embodiment.

Starter button PB1 makes the necessary contact to energize the motor starter SM and coil of CR2 and coil of CR3. The contacts CR3-2 and CR2-2 close to energize solenoid F. APV is an air pressure valve which allows air to pass from the source of supply to valves 64 and 72 which are controlled by solenoids F and R.

When starter button PB1 is pressed air passes through valve 64 into cylinder 55 and moves slide 20 downward until the air cylinder piston 56 reaches the limit of its travel. During this downward movement of slide 51 as hitherto described pinion 50 is rotated and likewise pinion 48 which rotate in mesh with rack teeth 46 of member 45, thus urging saddle 14 to the right. As member 45 travels to the right a push rod 65 drops into recession 66 of member 45 (Fig. 1). The dropping of push rod 65 closes the contact of limit switch S10 and completes the contact to start motor SM. This starts the stroking of cutter spindle 13 along with the rotation of depth feed cam 15 and the rotation of cutter spindle 13 and work spindle 11.

Limit switch S10 is also a safety switch which serves to prevent the machine from running when the saddle is in a leftward position because push rod 65 is then out of its recession 66 and is riding on top of rack member 45 and the contact of S10 is broken so the motor cannot start.

When the saddle 14 has traveled to the right bringing the cutter into the cutting zone relative to the work blank the stroking motor starts and the depth feed cam starts rotating. The rotation of cam 15 tends to urge roller 22 and slide 21 downward until roller bearing 24 engages the cam surface 42 of member 39. At this point cam 67 (Fig. 2) has rotated until its high point has lifted push rod 68 to open limit switch S11 and break the contact A between line L2 and line L5 and to shunt the power down through line L7 by limit switch S11 contacting B, at which point CR3 and solenoid F are de-energized. When the saddle moves to the right limit switch S7 is closed to insure the contact through line L7 to solenoid R.

Switch S7 is closed by protruding rod 69 (Fig. 1) moving to the right with saddle 14 and the tapered portion 70 of rod 69 allowing push rod 71 of limit switch S7 to drop down, thus closing switch S7.

The energizing of solenoid R controls the movement of valve 72 (Fig. 6) and air is applied to the bottom of cylinder 55. The application of air to cylinder 55 through valve 72 by means of cam 67 which is mounted on shaft 16 actuating the reverse air limit switch S11 tends to urge slide 20 and piston rod 56 upward, thus keeping roller 24 in contact with the cam surface 42 of member 39. The stroking of cutter spindle 13 continues until the depth feed cam has fed the cutter into depth and the work has rotated one complete revolution after reaching full depth. When the gear is completed the automatic stop cam 73 also mounted on shaft 16 (Fig. 2) has rotated until its high point raises push rod 74 to de-energize limit switch S1$^B$ on line L4. This de-energizes SM and one of its contacts breaks the holding circuit for CR2.

The tripping mechanism starts when depth feed cam 15 has rotated until the low point of cam 15 comes around to a point where roller bearing 22 will drop into its low point. At this point cam 67 actuates limit switch S11 through push rod 68 and causes S11B to open and S11A to close. This causes limit switch S9 to open. Therefore solenoid R is de-energized and air is exhausted from both ends of cylinder 55 since the contactor CR2–2 on line L6 prevents solenoid F from energizing. Limit switch S1B is actuated during the tripping of slide member 21 by cam 73.

S1B is reclosed in preparation for the next time start button PB1 is pressed.

When slide 21 travels upward and roller bearing 22 drops into the low point of cam 15 slide 21 abuts against push rod 74 (Fig. 1) to actuate limit switch S9 and close its contact to energize solenoid R. Then the air is restored through valve 72 to move the saddle to the left. Solenoid R is de-energized when the saddle has traveled far enough to the left for protruding rod 69 to contact push rod 71 of limit switch S7, thus opening limit switch S7. The saddle is far enough to the left to allow removing the finished work piece and replacing a new work blank on the arbor 11.

PB3 designates the traverse jog left button which may be used to move the saddle farther to the left if a larger than usual work piece has to be removed from or placed on arbor 11. The leftward movement of saddle 14 will then be limited by a contact member 75 (Fig. 1) abutting against push rod 76 of limit switch S8 to open S8 and de-energize solenoid R. This will cushion the impact of the saddle when it reaches its positive stop.

PB2 designates the stop button which may be used to stop the machine at any time.

THO1 and THO2 are merely thermo safety elements on line L4 which may be employed if desired.

F designates the various fuses on the lines which prevent overloading.

T designates the transformer which reduces the load from the main motor to the various electrical elements. P designates the three phase power coming into the machine.

CR2–1, CR2–2, CR2–3 and CR2–4 are elements of control relay CR2 which are shown in the schematic drawing (Fig. 5) When control relay CR2 is energized these various contactors function to make the necessary connections in the cycle of the electrical operation.

SM1 designates the start motor contactor which closes when the start motor is energized.

CR3–1, CR3–2 and CR3–3 are elements of control relay CR3. These various contactors close and open when coil of CR3 is energized or de-energized.

Other suitable electrical or mechanical controls may be employed if desired to obtain the proper sequence of operations in the manner known to any person skilled in the art.

What I claim and desire to secure by Letters Patent is:

1. In a gear finishing machine having a work spindle, a cutter spindle, a saddle in which one of said spindles is mounted and ways slidably mounting said saddle so that a cutter on said cutter spindle may be fed into depth relative to a work piece on said work spindle, a saddle traversing means consisting of a depth feed cam, means to rotate said cam, a follower engaging said cam, a mounting for said follower movable in a direction at an angle to the axis of rotation of said cam, a second cam member joined to said saddle, said second cam member having a contact portion extending in the direction of movement of said mounting, and a bearing member on said mounting adapted to contact said second cam member.

2. In a gear finishing machine having a work spindle, a cutter spindle, a saddle in which one of said spindles is mounted and ways slidably mounting said saddle so that a cutter on said cutter spindle may be fed into depth relative to a work piece on said work spindle, a saddle traversing means consisting of a depth feed cam, means to rotate said cam, a follower engaging said cam, a mounting for said follower movable in a direction at an angle to the axis of rotation of said cam, a second cam member joined to said saddle, said second cam member having a contact portion extending in the direction of movement of said mounting, a bearing member on said mounting adapted to contact said second cam member, and means urging said second cam member into engagement with said bearing member.

3. In a gear finishing machine having a work spindle, a cutter spindle, a saddle in which one of said spindles is mounted and ways slidably mounting said saddle so that a cutter on said cutter spindle may be fed into depth relative to a work piece on said work spindle, a saddle traversing means consisting of a depth feed cam, means to rotate said cam, a follower engaging said cam, a mounting for said follower movable in a direction at an angle to the axis of rotation of said cam, a second cam member joined to said saddle, said second cam member having a contact portion extending in the direction of movement of said mounting, a bearing member on said mounting adapted to contact said second cam member, and means urging said second cam member into engagement with said bearing member, said last named means including a fluid actuator geared to said saddle and operable in timed relation to the cutting action between cutter and work.

4. In a gear finishing machine having a work spindle, a cutter spindle, a saddle in which one of said spindles is mounted and ways slidably mounting said saddle so that a cutter on said cutter spindle may be fed into depth relative to a work piece on said work spindle, a saddle traversing means consisting of a depth feed cam, means to rotate said cam, a follower engaging said cam, a mounting for said follower movable in a direction at an angle to the axis of rotation of said cam, resilient means urging said mounting in the direction of said cam, a second cam member joined to said saddle, said second cam member having a contact portion extending in the direction of movement of said mounting, and a bearing member on said mounting adapted to contact said second cam member.

5. In a gear finishing machine having a work spindle, a cutter spindle, a saddle in which one of said spindles is mounted and ways slidably mounting said saddle so that a cutter on said cutter spindle may be fed into depth relative to a work piece on said work spindle, a saddle traversing means consisting of a depth feed cam, rotating means for said cam, a slide member extending at an angle with respect to the axis of rotation of said cam, a follower on said slide adapted to be engaged by said cam, means urging said slide in the direction of said cam, a second cam member connected to said saddle and slidable transversely with respect to said slide, a bearing member fixed to said slide and adapted to engage said second cam member to impart motion to said saddle and means urging said cam member and said saddle in the direction of said bearing member.

6. In a gear finishing machine having a work spindle, a cutter spindle, a saddle in which one of said spindles is mounted and ways slidably mounting said saddle so that a cutter on said cutter spindle may be fed into depth relative to a work piece on said work spindle, a saddle traversing means consisting of a depth feed cam, rotating means for said cam, a slide member extending at an angle with respect to the axis of rotation of said cam, a follower on said slide adapted to be engaged by said cam, means urging said slide in the direction of said cam, a threaded cam member engaging a nut held against axial movement in said saddle, means to rotate said nut, a toothed member engaging a second nut held against axial movement in said saddle, a rack slideable in the direction of movement of said slide, gearing between said rack and said toothed member, a bearing member fixed to said slide and adapted to engage said second cam member to impart motion to said saddle, and means urging